B. FALKENBERG.
SUBMERGED ELECTRIC HEATER.
APPLICATION FILED JAN. 31, 1911.
1,092,523.
Patented Apr. 7, 1914.
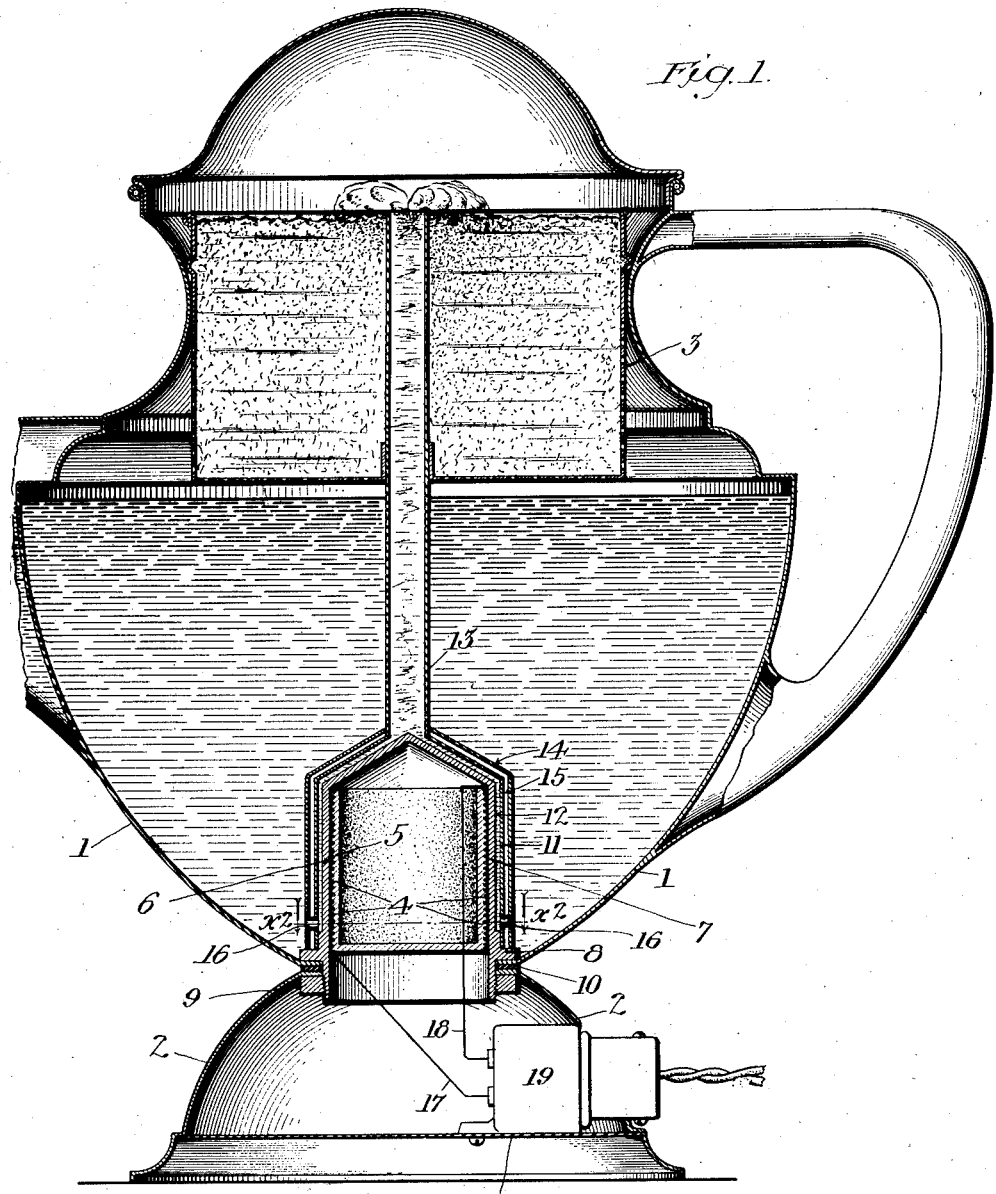
Fig. 1.
Fig. 2.
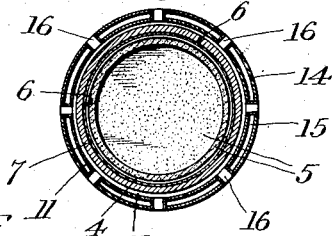
Witnesses:
Lute D. Alter
J. D. Thornburgh
Inventor:
Bjarne Falkenberg
by Townsend Haux Hackley
atty.

UNITED STATES PATENT OFFICE.

BJARNE FALKENBERG, OF ONTARIO, CALIFORNIA, ASSIGNOR TO PACIFIC ELECTRIC HEATING COMPANY, OF ONTARIO, CALIFORNIA, A CORPORATION OF CALIFORNIA.

SUBMERGED ELECTRIC HEATER.

1,092,523.  Specification of Letters Patent.  Patented Apr. 7, 1914.

Application filed January 31, 1911. Serial No. 605,789.

*To all whom it may concern:*

Be it known that I, BJARNE FALKENBERG, a subject of the King of Norway, residing at Ontario, in the county of San Bernardino and State of California, have invented a new and useful Submerged Electric Heater, of which the following is a specification.

This invention relates to submerged electric heaters wherein the heater is immersed in liquid to be heated, and the main object of the invention is to cause the heating of the liquid to commence sooner after the current is turned on than heretofore. In this type of heater the heating element is submerged in the liquid to be heated, and the liquid is conducted in an annular stream along the heating unit and subjected to the heat thereof, but, owing to the relatively large volume of unheated liquid which surrounds the annular stream of liquid, the temperature of the latter is kept down on account of the absorption of heat from it by the surrounding body of liquid. To obviate this I provide a heat insulating means between this annular stream of liquid which is being heated and the main body of the liquid which prevents heat from the annular stream being absorbed by or transmitted to the larger body of liquid, and thereby cause the annular stream to be very quickly heated to the desired temperature and ready for use much more quickly after starting the heater in operation than has heretofore been possible without the heat insulating means between the liquid being heated and the main body of liquid. In practice I have found that this construction will cause the stream to be heated to the desired degree in from twenty to twenty-five seconds after turning on the current; while, without the heat insulating element between the main body of liquid and the annular stream being heated, seven minutes was required to raise the stream to the same degree of temperature. Obviously, even where the desired degree of temperature was reached slowly, a greater amount of the liquid would be heated, but in this type of heater the important thing is to have a relatively small amount of the liquid heated very quickly and to maintain this rate of heating during the operation of the heater.

When the invention is applied to one of its most important uses, as in a coffee percolator, the prime requisite is to start the percolation quickly. To do this it is not necessary that the entire volume of water be quickly heated throughout, but it is necessary that a small amount of it be quickly heated and this is what the present invention accomplishes by reason of the insulation of that part of the liquid being heated from the larger volume which is not being heated.

Heretofore in coffee percolators the heating element has been arranged below the bottom of the receptacle containing the water, but in the present invention I locate the heating unit within the liquid so that the heating unit is surrounded by a much larger amount of the water than where the heating element is below the bottom and for that reason, practically all of the heat which is generated by the heating element must be absorbed by the liquid surrounding it, and in addition to the economy resulting from the utilization of all of the heat generated, there is the further advantage of the water being heated more quickly. A further advantage of this construction is that as the heating element is located within the water receptacle, the percolator is a self-contained unitary construction with no parts to become lost or disarranged and it may be readily placed on the table. The location of the heating element being within the body of liquid does not add to the height of the receptacle and therefore the percolator stands lower than heretofore.

In the drawings I have shown the invention as applied to a coffee percolator, although, as above stated, its use is not to be thus restricted, and referring thereto:

Figure 1 is a vertical cross sectional view through the percolator. Fig. 2 is a horizontal section on line $x^2$—$x^2$ Fig. 1.

1 designates the main liquid receptacle which is mounted on a base 2.

3 designates the coffee receptacle.

The heating unit comprises, in the present embodiment, a resistance wire 4 which is wound over a drum 5 of lava or other non-conducting material, lava being preferred by reason of its non-heat-conducting and non-electrical-conducting properties. This heating unit is surrounded by a layer of mica 6 and the heating unit thus formed is inclosed in a brass housing 7, the latter having a flange 8 at its lower end which rests against the bottom of the main receptacle 1 and a nut 9 is screwed on the lower end of the housing 7 and secures the base 2 to the receptacle 1 and at the same time holds the housing 7 in position, there being packing 10 between the main receptacle 1 and base 2 which prevents leakage. Surrounding the housing 7 is a shell 11 which forms a space 12 next to the housing 7 and the space 12 communicates with a vertical tube 13 connected to the top of the shell 11, the tube 13 extending up through the coffee receptacle 3. Surrounding the shell 11 is a jacket 14 with an air chamber 15 between the jacket 14 and shell 11 which forms a heat insulating means surrounding the shell 11. Liquid from the main receptacle 1 is furnished to the lower part of the chamber 12 by a series of short tubes 16 which pass through the jacket 14 and shell 11. The ends 17 and 18 and the wire 4 are connected with a switch plug 19 which is arranged within the base 2, there being a false bottom 20 within the base 2 which prevents the parts within from being tampered with.

In operation, the liquid is placed within the main receptacle 1 and the coffee is placed within the receptacle 3. When electric current is turned on, the resistance wire 4 becomes highly heated, the inward radial passage of the heat being resisted by the drum 5, while the brass housing 7, being a good conductor of heat, conducts the heat thus generated directly to the annular stream of water which lies within the chamber 12. The water in the chamber 12 being distributed in a thin film and in contact with the hot brass housing 7 becomes heated to the point where percolation will commence in a few seconds after the current is turned on and produces an upward flow through the tube 13. The heated water overflows from the tube 13 and percolates down through the coffee within the receptacle 3 and thence returns to the main body of liquid within the receptacle 1. The heat which reaches the cylindrical column of water within the chamber 12 is retained wholly by the water therein, as the dead air chamber 15 which surrounds it prevents any heat passing from the water in chamber 12 to the main body of liquid surrounding the jacket 14. I have found in practice that where the main body of liquid within the receptacle 1 comes into direct contact with the shell 11, it absorbs heat from the liquid which is within the chamber 12, so that the latter liquid does not become heated much faster than the surrounding body of liquid, in such a construction about seven minutes being required to raise the temperature of the liquid to the point where percolation will commence; but with the air chamber 15, the heat which is transmitted to the liquid within the chamber 12 is retained by that liquid and being prevented from passing to the main body of liquid, under such conditions in from twenty to twenty-five seconds after starting the heater, percolation will commence.

What I claim is:

1. In an electric liquid heater, a main receptacle, a housing with a flange resting against the bottom of the main receptacle, a base through which the lower end of the housing projects, a nut screwed to the housing and securing said base, a shell surrounding said housing and forming a liquid chamber, a jacket surrounding said shell chamber, a jacket surrounding said shell and forming an air chamber, an insulating drum within the housing, resistance wire wound on the drum, a tube extending up from the shell, another receptacle in the upper part of the main receptacle through which the tube passes, and a switch plug within the base connected with the resistance wire.

2. An electric liquid heater comprising a drum of non-conductive material, resistance wire wound thereon, a cylindrical brass housing of heat conducting material surrounding the wire, a shell around the housing forming a liquid chamber between the shell and housing, a tube extending up from the liquid chamber, and a jacket surrounding the shell forming an air space between the jacket and shell.

3. An electric liquid heater comprising a drum of non-conductive material, resistance wire wound thereon, a cylindrical brass housing of heat conducting material surrounding the wire, a shell around the housing forming a liquid chamber between the shell and housing, a jacket surrounding the shell forming an air space between the jacket and shell, a tube extending up from said shell, and a series of tubes extending through said jacket and shell to convey liquid from outside the jacket to the interior of the shell.

In testimony whereof, I have hereunto set my hand at Ontario, California, this 25th day of January, 1911.

BJARNE FALKENBERG.

In presence of—
 LEWIS H. MEST,
 FRANKLIN BOOTH.